Patented Aug. 2, 1927.

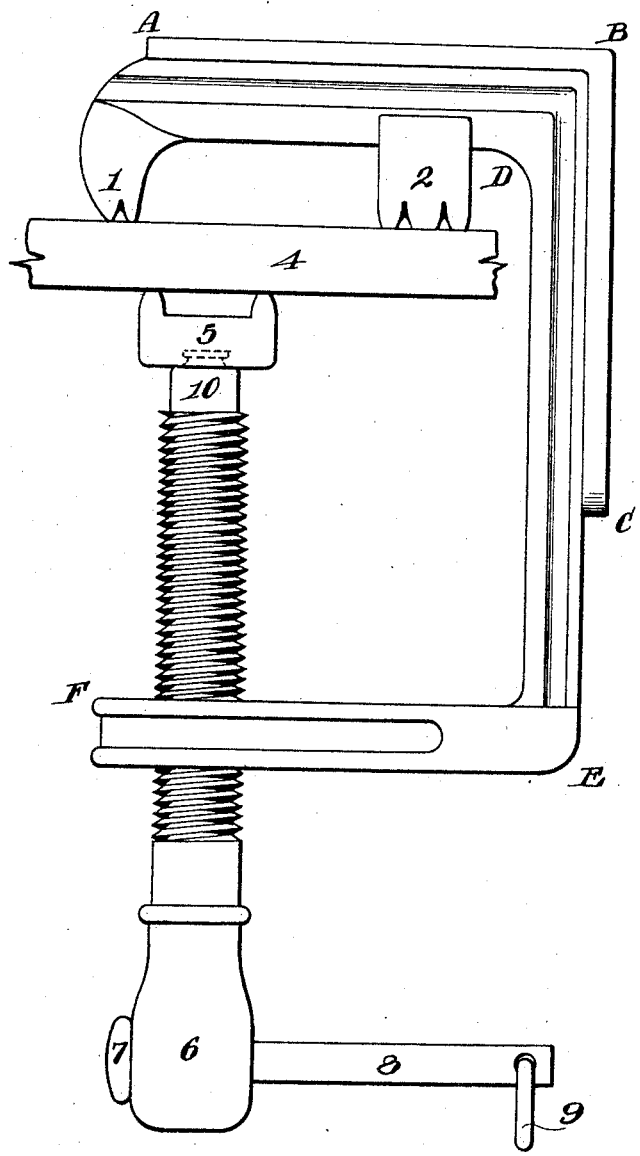

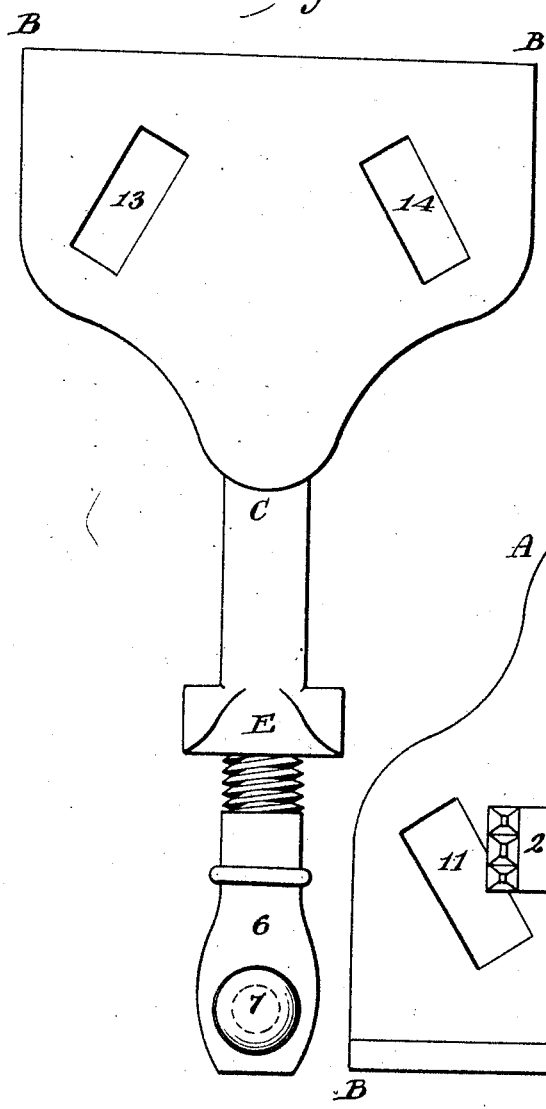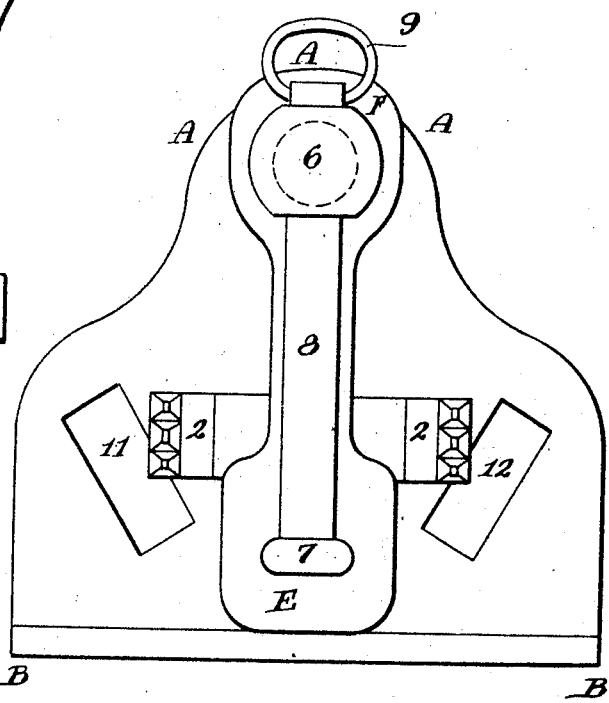

1,637,654

UNITED STATES PATENT OFFICE.

FRANCISCO HERNANDEZ y PEREZ, OF HABANA, CUBA.

CLAMP.

Application filed June 22, 1921, Serial No. 479,528, and in Cuba March 7, 1921.

The object of the invention is to provide an improved clamp which is adapted for use by carpenters and other wood workers for clamping work such as boards or the like and which is also adapted for use to hold a pipe clamp or the like firmly to facilitate the work of plumbers, steam fitters and other artisans.

With the above and other objects in view, my invention consists in the construction, combination and arrangement of devices hereinafter described and claimed.

In the accompanying drawings:—

Fig. 1 is an elevation of my improved clamp.

Fig. 2 is a similar view at right angles.

Fig. 3 is an inverted plan of the same.

Figure 1 represents a lateral view of my clamp device indicating by the respective numerals and letters the different parts of which it is composed and their application. For example: A B is a platform in a horizontal position, intended for the support and fixture of the clamps utilized by mechanics, fitters and others, to grip tubing, pipes, screws and such material. B C is the representation of another platform exactly similar to A B but for the purpose of serving in a horizontal position when the point of support such as the wooden board indicated by 4, is shown in a vertical position, instead of a horizontal form as shown in Figure 1.

Each arm, A B and B C is provided with two slots in the arrangement indicated by Figures 2 and 3, respectively, which serve to introduce the bolts or screws wherewith to secure a pipe or other clamp, as before stated, to my clamp device, which pieces joined together as if they were only one, are fixed securely to the board 4, by means of the points of support, 1, 2, and 3, which as shown in the drawing, are provided with serrations to avoid slipping on the board.

The shoe 5 is swivelly mounted at the end of the screw indicated at 10, of Figure 1, to allow the free rotation of the screw independently of the shoe.

The screw 6 may be turned by means of the lever 8 and has a head 7 at one of its ends, the other end having an opening through which is introduced a ring 9, to prevent the casual detachment of said lever from the head of the screw 6. Said screw extends through a threaded opening in the arm E, F. Hence my clamp, including the arms A, B, rear side C and lower arm E, F, is a frame forming a rectangular opening on one side and is an integral cast iron body. In connection with the screw 6 the said body forms a clamp which is not only especially adapted for use by carpenters and other wood workers, but which may also be employed to secure devices such as a pipe clamp rigidly in place.

By the provision of the bearing members 1, 2 the board or other work 4 is not only held firmly in place, but is held at a sufficient distance from the arm A, B to permit the placing of the bolts used for securing the pipe clamp or like device in place through the openings 11, 12, as will be understood. The platform or arms A, B are provided with openings 11, 12, 13, 14 as shown in Figures 2 and 3 to facilitate the application of screws or the like to the work.

What I claim is:

The herein described clamp comprising a frame forming a rectangle open on one side and consisting of a lower arm, an upper arm broader than the lower arm and a rear side connecting said arms, the said upper arm having serrated bearing members projecting from its lower side and also having openings to facilitate the application of screws or the like for securing an object such as a pipe clamp or the like to said arm, said rear side also having such openings, the said lower arm having a clamping screw extending therethrough toward said upper arm and provided with a swivelly mounted shoe at its upper end.

In witness whereof I affix my signature.

FRANCO. HERNANDEZ y PEREZ.